United States Patent [19]

Callahan et al.

[11] Patent Number: 4,871,575
[45] Date of Patent: Oct. 3, 1989

[54] FLAVOR AND TEXTURE IMPROVED CANNED ANIMAL FLESH AND PROCESS

[75] Inventors: Timothy Callahan, Delhi, N.Y.; Jack Herz, Weston, Conn.

[73] Assignee: Deltown Chemurgic Corporation, Greenwich, Conn.

[21] Appl. No.: 164,611

[22] Filed: Mar. 7, 1988

[51] Int. Cl.$^4$ .............................................. A23L 1/325
[52] U.S. Cl. ................................... 426/643; 426/652; 426/656; 426/657
[58] Field of Search .................. 426/18, 52, 622, 626, 426/627, 650, 652, 657, 643, 34, 42, 656

[56] References Cited

U.S. PATENT DOCUMENTS

| | | | |
|---|---|---|---|
| 3,167,432 | 1/1965 | Colby | 426/18 |
| 3,852,479 | 12/1974 | Yokotsuka et al. | 426/52 X |
| 3,900,576 | 8/1975 | Schulz | 426/643 X |
| 3,928,652 | 12/1975 | Lanter | 426/643 |
| 3,930,029 | 12/1975 | Minami et al. | 426/42 X |
| 3,932,671 | 1/1976 | Yokotsuka et al. | 426/18 X |
| 3,952,111 | 4/1976 | Desrosier | 426/622 X |
| 3,968,269 | 7/1976 | Payne et al. | 426/643 X |
| 4,213,896 | 7/1980 | Davis | 426/657 X |
| 4,282,319 | 8/1981 | Conrad | 426/18 X |
| 4,363,820 | 12/1982 | Ernster | 426/643 X |

OTHER PUBLICATIONS

Kraetz et al, Abstract from DD 156921, 9-29-82.

*Primary Examiner*—Arthur L. Corbin
*Attorney, Agent, or Firm*—Wolder, Gross & Yavner

[57] ABSTRACT

The invention relates to a process and composition for enhancing the flavor and improving the texture of animal flesh, such as tuna fish in a can, by adding flour, such as rice flour, which has been hydrolyzed with a proteolytic enzyme, to the animal flesh.

6 Claims, No Drawings

FLAVOR AND TEXTURE IMPROVED CANNED ANIMAL FLESH AND PROCESS

FIELD OF THE INVENTION

This invention pertains to a process and composition for enhancing the flavor and texture of canned fish or meat and more particularly to the use and preparation of a proteolized flour as a moderator of canned animal flesh.

BACKGROUND OF THE INVENTION

Canned fish and meat products are most often packed with oil or broth in order to eliminate variability, enhance flavors, or reduce unpleasant odors and flavors, and also to improve the texture and press weight of the animal flesh. The packing additives usually contain moderators such as hydrolyzed caseins and caseinates or vegetable broths of various kinds. While these additives have been most successful in achieving an improved product, research has continued, in order to develop protein hydrolysates of greater efficacy and efficiency.

The present invention has discovered that a flour base, such as rice, pea or potato flour, or bean or soy flour, can be hydrolyzed under neutral conditions by a proteolytic enzyme to provide a new and improved hydrolyzed protein additive.

In particular, rice flour which is neutralized to a pH of $7.0 \pm 0.5$, and treated with an enzyme, including but not limited to enzymes such as papain, pancreatin or a microbial enzyme i.e., a fungal proteolytic enzyme, or another fungal protease can provide an additive that on a one-to-one basis has approximately twice the effectiveness and benefits afforded by hydrolyzed casein based products, such as casein which has been hydrolyzed by a proteolytic enzyme.

This additive, while intended to be used primarily with fish flesh such as tuna, salmon, sardines, pilchard and mackerel, etc., is also useful for canned meat, such as ham, chicken, turkey, pork and beef, as well as shellfish.

BRIEF SUMMARY OF THE INVENTION

The invention features an improved additive for canned animal flesh, and the process for fabricating same. The additive in the form of a moderator improves the flavor and texture of the canned product, and increases its press weight.

The moderator comprises neutralized, powdered rice flour which has been hydrolyzed by a proteolytic enzyme such as, papain, pancreatin or enzymes of microbial origin. After neutral hydrolysis, the rice flour is dried and then resolubilized to form a 1 to 6% aqueous solution. The moderator is applied, for example, to the flesh of tuna in the can by treating the aqueous solution to about 150° to 180° F., and then pouring approximately two ounces of the heated solution over 4.5 ounces of tuna fish flesh in the can.

The hydrolyzed rice flour solution can be mixed in various ratios with other moderators, such as: acid-hydrolyzed casein, acid-hydrolyzed rice protein isolate, or concentrate hydrolyzed vegetable protein, and enriched rice protein isolate. These added moderators are solubilized in a range from 1 to 50% by weight, and add to the efficacy of the hydrolyzed flour.

Rennet- or other enzyme-hydrolyzed casein in a 1 to 95% by weight can be added to the hydrolyzed rice flour directly or can be admixed with any one of the other moderators and the rice flour hydrolysate.

The rice flour protein hydrolysate is prepared by first neutralizing a rice flour solution to a pH of approximately $7.0 \pm 0.5$, by the addition of a sufficient amount of an alkaline hydroxide, such as sodium or potassium hydroxide.

The neutralized rice flour is then admixed with a proteolytic enzyme at sufficient temperature for a sufficient time until the protein is digested. The enzyme is then inactivated.

The hydrolyzed rice flour is then spray dried, to form a powder, which can then be resolubilized for use. Other vegetable flours, such as pea, bean, soy, potato and the like may be similarly treated, provided that they have a sufficient concentration of enzyme-hydrolyzeable protein.

DETAILED DESCRIPTION OF THE INVENTION

Generally speaking, the invention relates to a protein hydrolysate formed from the action of a proteolytic enzyme upon a flour base. The protein hydrolysate is used as a moderator for canned animal flesh, such as tuna fish.

The flour base of the invention can be a rice, pea or potato flour, etc., but the rice flour is preferred. The rice flour is neutralized in solution to a pH of approximately $7.0 \pm 0.5$. If acidic, sodium or potassium hydroxide can be added. If too basic, hydrochloric or sulfuric acid can be used.

The neutralized rice flour is then adjusted to the temperature of the particular proteolytic enzyme used to hydrolyze the rice flour.

In the case of papain, the preferred enzyme, the temperature is adjusted to between 120° to 140° F. The papain is added into the neutralized rice flour and the admixture is allowed to react for approximately 1 to 2 hours.

The degree of hydrolysis is monitored in the laboratory by measuring either the amino nitrogen content, which should be in the range from 0.1 to 3.0%, or a 50% decrease in viscosity, which can be measured by a Brookfield viscometer.

Other techniques for measuring hydrolysis may include SDS Page electrophoresis and H.P.C.C. molecular weight analysis.

In commercial practice, the time necessary to effect the digestion of the protein will be calculated in advance, thus requiring little or no monitoring.

If using pancreatin as the proteolytic enzyme, the admixture is maintained at a temperature between 120° to 125° F. for about 1 to 2 hours.

If utilizing a microbial protease, the admixture is maintained at a temperature between 120° to 25° F. for approximately 1 to 2 hours.

After digestion has been completed, the enzyme is deactivated by elevating the temperature to approximately between 150° to 180° F. for about 1 hour.

The pH of the hydrolyzed rice flour can then be readjusted to $7.0 \pm 0.5$ using NaOH, KOH or HCl, $H_2SO_4$, if necessary.

The neutralized and hydrolyzed rice flour solution is then fed into a spray dryer, for example, one manufactured by Sterner Industries, Winsed, Wisc. The solution is fed into the spray dryer under a pressure in the range from 2,000 to 4,000 lbs. per sq. inch. Preferably, the pressure is maintained at somewhere around 2,800 lbs. per sq. inch.

A maximum exhaust temperature of 190° F. is maintained so that the resulting powder will not be burned.

A typical analysis of a hydrolyzed rice flour processed in accordance with the invention, is set forth below in Table I.

TABLE I

| CHEMICAL CHARACTERISTICS | | | |
|---|---|---|---|
| AN/TN × 100 | 12.5% | | |
| Ash | 1.1% | | |
| NaCl | 0.5% | | |
| Moisture | <5.0% | | |
| pH (2% solution | 5.9% | | |
| MICROBIAL CONTENT | | | |
| Standard Plate | <5000/gm | | |
| Coliform | <10/gm | | |
| Thermophiles | <1000/gm | | |
| Yeast and Mold | <100/gm | | |
| Salmonella | Neg/25 gm | | |
| AMINO ACID COMPOSITION | | | |
| | mg/gm | | mg/gm |
| Lysine | 3.0 | Alanine | 4.5 |
| Histidine | 2.0 | Cystine | 1.4 |
| Arginine | 8.1 | Valine | 5.2 |
| Aspartic Acid | 7.4 | Methionine | 2.4 |
| Threonine | 2.8 | Isoleucine | 3.7 |
| Serine | 3.9 | Leucine | 7.1 |
| Glutamic Acid | 13.7 | Tyrosine | 3.2 |
| Proline | 3.8 | Phenylalanine | 3.9 |
| Glycine | 3.8 | Tryptophan | 0.9 |

An example of rice flour which can be used in the invention has the commercial designation Riviana Rice Flour RL-100.

A typical batch process is described in the following example:

EXAMPLE

In a sanitized blending Yat, 300 gallons of water at 110° was mixed with 250 pounds of rice flour.

The pH was adjusted from 7.34 to 7.06 by the addition of 55 mls of concentrated HCl.

The neutralized rice flour solution was heated to 120° F., and 1.25 pounds of pancreatin was mixed in.

The temperature of the admixture was held for 1.5 hours, and then raised to 155° F.±5° F. for about 0.75 hours.

The admixture was kept at 150° F. until introduction into the dryer.

Prior to drying the pH of the reaction mixture was re-adjusted from 6.89 to 7.13 using 300 gr. of potash.

A yield of 80% was obtained.

Using the spray dried batch of the foregoing example, the following tests were conducted upon canned tuna, with various flours:

Test No. 1

A 6% by weight solution of the hydrolyzed rice flour was mixed under slow heat with a 6% by weight solution of DELLAC 86-101 in a ratio of 1:1. DELLAC 86-101 is a commercially processed casein based protein hydrolysate system manufactured by Deltown Chemurgic., Fraser, N.Y. There was about a 3.5% increase in drain weight with better flavor vs. water, when 2 ounces were applied to 4.5 ounces of tuna fish flesh in the can.

Test No. 2

Two ounces of a 3% by weight solution of the hydrolyzed rice flour was applied neat to 4.5 ounces of tuna fish flesh in the can.

There was a 9% increase in drain weight vs. water.

Test No. 3

Two ounces of a 6% by weight solution of the hydrolyzed rice flour was applied neat to 4.5 ounces of tuna fish flesh in a can. Using this same 6% weight solution, this was also done with respect to potato flour, soy flour and pea flour. In the case of rice flour, there was a 13% increase in drain weight vs. $H_2O$. Also, in another test with rice flour, there was an 18% increase in drain weight vs. water. In all cases with rice, potato, soy and pea flour, there was a 13% to 18% increase in drain weight vs. water.

Two ounces of a 3% by weight solution of hydrolyzed rice flour and pea flour were each applied neat to tuna flesh in a can. This produced either a 6% or a 9%, up to 13%, increase in drain weight vs. water and therefore it is clearly indicated that potato flour and soy flour would produce the same result, in terms of range of increase in drain weight.

Test No. 4

Comparison was made between 6% by weight solutions of DELLAC 86-101 and the hydrolyzed rice flour of the invention. When two ounces of each solution were separately applied to 4.5 ounces of tuna fish flesh in the can, a 7.2% increase in drain weight was noted with the hydrolyzed rice flour.

It is contemplated within the inventive scope, that the rice flour hydrolysate can be mixed with 1 to 95% by weight solutions of DELLAC 86-101, or E-PRO-HY, a product of U.S. Pat. No. 3,846,397, and rennet-hydrolyzed casein.

Other admixtures are also contemplated including 1 to 20% by weight solutions of acid-hydrolyzed casein; acid-hydrolyzed rice protein isolate; and hydrolyzed vegetable protein.

Having thus described the invention, what is desired to be protected by Letters Patent is presented in the subsequently appended claims.

What is claimed:

1. A composition of canned tuna fish flesh of enhanced flavor and improved texture, comprising said tuna fish flesh in combination with a water soluble or dispersable rice flour which has been neutralized and hydrolyzed by a proteolytic enzyme.

2. The composition of claim 1 in admixture with at least one other protein hydrolysate selected from the group consisting of: acid-hydrolyzed casein, acid-hydrolyzed rice protein isolate, enzyme-hydrolyzed casein, enzyme-hydrolyzed rice protein isolate, hydrolyzed vegetable protein, rennet-hydrolyzed casein.

3. The composition of claim 1, wherein said neutralized hydrolyzed and rice flour is solubilized to form an aqueous solution of approximately 1 to 6% by weight and combined with said flesh.

4. The composition of claim 3, wherein said solution is in admixture with an aqueous solution of approximately 1 to 20% by weight of at least one other protein hydrolysate selected from the group consisting of acid- or enzyme-hydrolyzed casein, acid- or enzyme-hydrolyzed rice protein isolate and hydrolyzed vegetable protein.

5. The admixture of claim 4, in further admixture with an aqueous solution of approximately 1 to 95% by weight of rennet- or other hydrolyzed casein.

6. The composition of claim 3, in admixture with an aqueous solution of approximately 1 to 95% by weight of rennet-hydrolyzed casein.

* * * * *